H. S. DIX, J. T. PRYOR AND C. COFFEY.
EXCESS SPEED ALARM.
APPLICATION FILED DEC. 24, 1917.

1,377,243.

Patented May 10, 1921.
2 SHEETS—SHEET 1.

H. S. DIX, J. T. PRYOR AND C. COFFEY.
EXCESS SPEED ALARM.
APPLICATION FILED DEC. 24, 1917.
1,377,243.
Patented May 10, 1921.
2 SHEETS—SHEET 2.
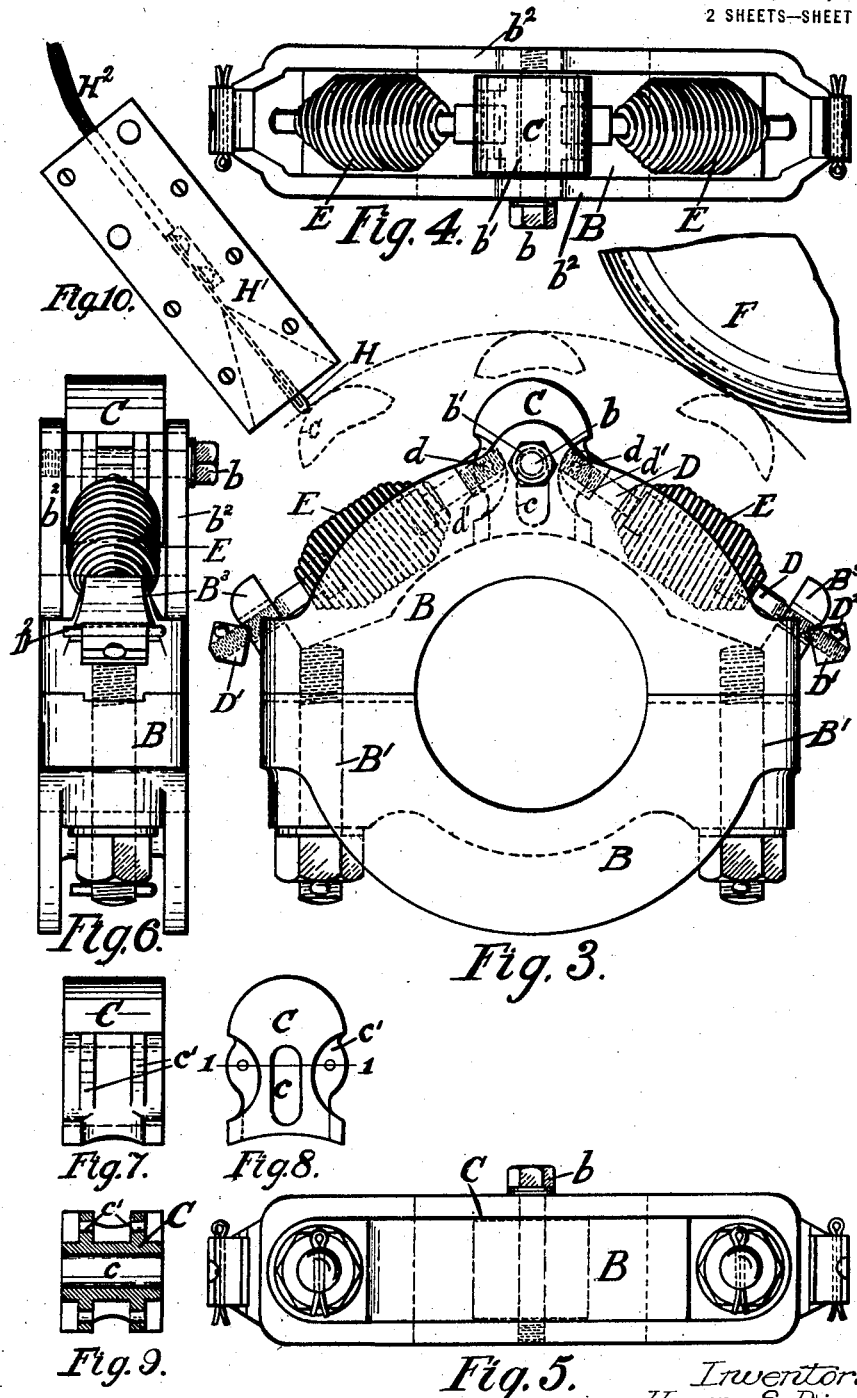
Inventors
Harry S. Dix
and John T. Pryor
Clifford Coffey
By Williams, Bradbury & Lee
Attys.

UNITED STATES PATENT OFFICE.

HARRY SIDNEY DIX, OF EAST MELBOURNE, JOHN THOMAS PRYOR, OF MALVERN, AND CLIFFORD COFFEY, OF EAST MALVERN, VICTORIA, AUSTRALIA.

EXCESS-SPEED ALARM.

1,377,243.   Specification of Letters Patent.   Patented May 10, 1921.

Application filed December 24, 1917. Serial No. 208,712.

*To all whom it may concern:*

Be it known that we, HARRY SIDNEY DIX, JOHN THOMAS PRYOR, and CLIFFORD COFFEY, British subjects, and residents, respectively, of 160 Gipps street, East Melbourne; "Holyrood," Horace street, Malvern; "Koonoowarra," Young street, East Malvern, all in the State of Victoria, Commonwealth of Australia, have invented new and useful Improvements in an Excess-Speed Alarm for Tramcars and other Wheeled Vehicles, of which the following is a specification.

This invention of an excess speed alarm for tram cars and other wheeled vehicles has been designed with the object of affixing to the axle of the car, an appliance consisting of a weighted member controlled by springs and hereinafter called a "sliding striker" which is capable of being projected outward by centrifugal force to a position at which it will strike a gong or bell when the revolutions of the axle and so the car speed exceed a certain predetermined limit, thus indicating to the driver that the car is running beyond the desired speed.

The term car is intended to include all other wheeled vehicles, and if so preferred, the said sliding striker may be affixed to another rotating shaft, the rotating speed of which, while being carried on the car, must necessarily bear a fixed relation to the road speed or travel of car.

As an alternative, the rotary part of the appliance carrying the sliding striker may be combined with an electric circuit so arranged as to give an intermittent alarm, by an electric bell or by lamps, signal or otherwise, located on the car.

Figure 1:
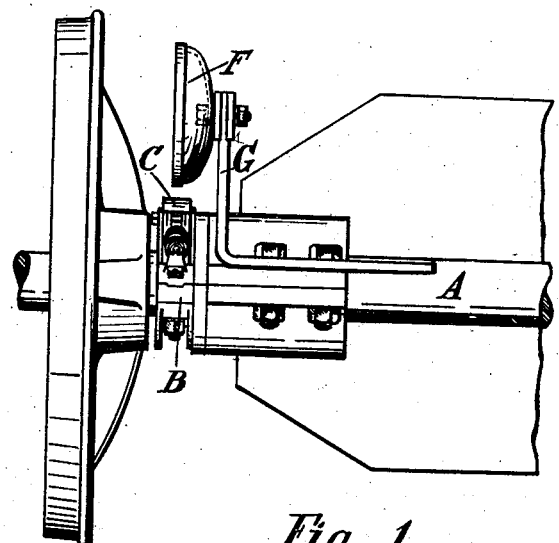
Figure 2:
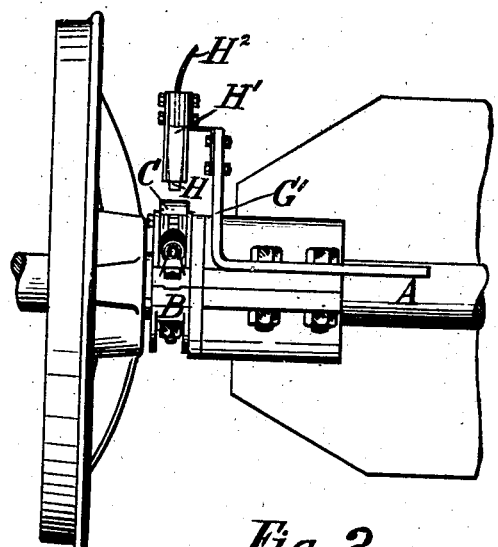

In order that our invention may be well understood it will now be fully described aided by a reference to the accompanying sheets of drawings throughout which similar letters of reference will denote corresponding parts and in which drawings Figures 1 and 2 are drawn to a smaller scale than the remaining figures.

Fig. 1 being a side view of the mechanical form of the apparatus as fitted upon and about the car axle and Fig. 2 a similar view to Fig. 1 of the alternative or intermittent electric circuit apparatus as arranged upon or about the car axle while Fig. 3 is a side view, Fig. 4 a top view, Fig. 5 a bottom view and Fig. 6 an end view of the collar appliance carrying the sliding striker, while Figs. 7 and 8 are edge and side views respectively of the sliding striker by itself and Fig. 9 a section of same on line 1, 1 Fig. 8.

Fig. 10 shows the terminal or contact maker of the alternative electric apparatus.

In fitting the excess speed alarm to the axle A of a car of the usual construction we provide a metal collar B made in halves with side lugs to allow of it being secured or clamped by bolts $B^1$ on the said car axle, said collar being furnished with the sliding striker C consisting of a metal piece or weighted member which lies intermediate of and at right angles to the joint on one side of the collar and has a slot $c$ in it to receive a tap bolt $b$ having a neatly fitting loose thimble $b^1$ on it, the sliding striker being arranged to lie between the guide flanges $b^2$ formed to receive it on the aforesaid collar in such a manner as to allow the said sliding striker to have a radial sliding movement on the aforesaid thimble between the said guide flanges.

The said sliding striker has at both its sides integral lugs $c^1$ to take pins $d$ which pass through screw nuts $d^1$ on end of bolts D secured to suitable coiled springs E, the farther end of each of said springs being held by similar bolts D secured by adjusting lock nuts $D^1$ to lugs $B^3$ provided on one of the half collars just behind the joint lugs, while the adjusting nuts $D^1$ for said bolts each lie on a V section bearing in lugs $B^3$ to accommodate the angular corner of the said square section bar nuts $D^1$ and thus allowing for the angular line of the springs as the sliding striker is projected outward by centrifugal force or returned inward by the springs, while the car is running, also the said sliding striker by being held in said slot hole by the thimble pin has free movement outward and inward radially within a fixed distance. The springs held in position by the bolt heads are so assembled that their tensional strength can be adjusted by the bar nuts of the bolts connecting them to the aforesaid lugs, said bar nuts being furnished with lock pins $D^2$.

The gong F is stationarily affixed to a suitable bracket support G or to the under frame or body of the car, at the requisite distance from the axle or collar for the sliding striker to strike it when an excessive car speed is attained.

The action of our apparatus is such that on the car attaining speed in excess of a predetermined maximum the axle or other shaft having the rotary part of the apparatus upon it, will revolve at such a speed that the sliding striker will by centrifugal force be projected outward sufficiently to strike or contact with the gong and by so doing, warn or alarm the driver, so that he may reduce the speed of the car when the springs will withdraw the sliding striker to its normal position on the aforesaid collar and clear of the gong in its rotation.

When the sliding striker is arranged to ring an electric bell or to light an electric lamp or operate a signal on the car, then the gong may be dispensed with and the sliding striker when sufficiently projected by the over speed travel of the car is caused to intermittently contact with a spring tongue H assembled in a socket bracket $H^1$ stationarily supported by a bracket $G^1$ about the axle or from the car body and with the said spring tongue connected to an electric circuit wire $H^2$, the other end of which is attached to an electric bell on the car or with an electric light or other signal appliance or further the gong F and electric contact tongue appliance H may both be used in combination for the purpose hereinbefore stated.

What we claim, and desire to secure by Letters Patent of the United States, is—

1. A speed alarm mechanism comprising a member rotatable at various speeds proportionally to the speed of a device, the speed of which it is desired to control, a signal spaced from said member and stationary with respect to said device, a striker mounted on said member capable of being projected a limited distance outwardly radially therefrom by centrifugal action to operate said signal, a pair of springs secured at one end to said striker, and at their other ends upon said member, means for adjusting the tension of said springs whereby said striker will operate said signal at correspondingly different speeds of rotation of said member, and said member comprising means for confining the movement of said striker to movement in a radial direction irrespective of any difference in tension which may exist in said springs.

2. A speed alarm mechanism for vehicles comprising a member rotated proportionally to the speed of the vehicle, an alarm signal mounted on a part of said vehicle stationary with respect thereto, a striker mounted upon said rotated member capable of being projected radially outwardly therefrom by centrifugal action to operate said alarm signal, a pair of tension springs interposed between said striker and said member to restrain the outward movement of the striker during rotation of the member, and means on said member for limiting the extent of movement of said striker, and confining its movement to movement in a radial direction irrespective of any difference in tension existing in said springs.

3. A vehicle comprising a shaft, a collar secured to said shaft, a striker slidably mounted on said collar, means for confining the movement of said striker to movement in a radial direction, spring means for restraining the outward movement of said striker when the shaft is rotated, and a bell positioned to be struck by the outer end of said striker when the shaft is rotated at a speed beyond a predetermined limit.

In testimony whereof we have signed our names to this specification in the presence of two subscribing witnesses.

HARRY SIDNEY DIX.
JOHN THOMAS PRYOR.
CLIFFORD COFFEY.

Witnesses:
BEDLINEFON BODYCOMB,
LESLIE LAWTON BEAR.